United States Patent [19]

Le Loarer

[11] Patent Number: 5,023,070
[45] Date of Patent: Jun. 11, 1991

[54] PROCESS FOR OBTAINING A CERIC OXIDE

[75] Inventor: Jean-Luc Le Loarer, La Rochelle, France

[73] Assignee: Rhone-Poulenc Chimie, Courbevoie, France

[21] Appl. No.: 213,147

[22] Filed: Jun. 29, 1988

[30] Foreign Application Priority Data

Jun. 29, 1987 [FR] France .................... 87 09122

[51] Int. Cl.⁵ ............................. C01B 13/14
[52] U.S. Cl. .......................................... 423/592
[58] Field of Search ............ 423/263, 592, 21.1, 423/21.5

[56] References Cited

U.S. PATENT DOCUMENTS

| | | | |
|---|---|---|---|
| 4,231,997 | 11/1980 | Pitts | 423/395 |
| 4,545,923 | 10/1985 | Gradeff et al. | 252/309 |
| 4,601,755 | 7/1986 | Melard et al. | 106/3 |
| 4,647,401 | 3/1987 | Gradeff et al. | 423/21.1 |
| 4,661,330 | 4/1987 | Chane-Ching et al. | 423/263 |
| 4,663,137 | 5/1987 | Chane-Ching et al. | 423/263 |
| 4,786,325 | 11/1988 | Melard et al. | 106/3 |
| 4,859,432 | 8/1989 | David | 423/21.1 |

FOREIGN PATENT DOCUMENTS

| | | | |
|---|---|---|---|
| 0216687 | 4/1987 | European Pat. Off. | 423/21.1 |
| 60-96527 | 5/1987 | Japan | 423/21.1 |
| 1159886 | 6/1985 | U.S.S.R. | 423/21.1 |

OTHER PUBLICATIONS

Hopkins, B. S., Chemistry of the Rarer Elements, D.C. Heath & Company N.Y. 1923, pp. 111, 176.
Meriaudeau et al., "Reports of the Acaademy of Sciences", Paris, vol. 297, Series II-471-473 1983.
Alvero et al., "Journal of the Chemical Society", Dalton Trans. 1984, pp. 87-91.

Primary Examiner—Theodore Morris
Assistant Examiner—Edward Squillante
Attorney, Agent, or Firm—Burns, Doane, Swecker and Mathis

[57] ABSTRACT

The present invention concerns a process for obtaining a ceric oxide, and, more precisely, a process for increasing and stabilizing at high temperature the specific surface area of a ceric oxide. The invention process, which consists of the preparation of a ceric oxide by calcination of a ceric hydroxide, is characterized by the fact that the ceric hydroxide is subjected to solvothermal treatment before calcination.

34 Claims, 1 Drawing Sheet

FIG. 1

PROCESS FOR OBTAINING A CERIC OXIDE

The present invention concerns a process for obtaining a ceric oxide, and, more specifically, a process for increasing the specific surface area of a ceric oxide and, in accordance with a variant of the invention, for stabilizing the specific surface area at high temperature.

The invention provides a ceric oxide giving an increased specific surface area which is stabilized at high temperature.

In the following description of the invention, the "specific surface area" signifies the specific B.E.T. surface area, determined by nitrogen adsorption in accordance with the ASTM D 3663-78 standard, as established on the basis of the BRUNAUER-EMMETT-TELLER method described in *The Journal of American Society.* 60, 309 (1938).

It is well known that ceric oxide may be used as a catalyst or catalyst carrier. Mention may be made, for example, of the work of Paul MERIAUDEAU and his colleagues, concerning the methanol synthesis, taking $CO+H_2$ as a basis, on catalysts on a plate set on ceric oxide (Reports of the Academy of Sciences, Paris, Volume 297 - Series II-471, 1983).

It is also well known that the effectiveness of a catalyst generally increases as a function of the increasing dimensions of the contact surface between the catalyst and the reagents. In order to achieve this, the catalyst must be kept in the most divided state possible, that is, the solid particles composing it must be as small and individualized as possible. The basic role of the carrier is, therefore, to keep the catalyst particles, or crystallites, in contact with the reagents, in the most divided state possible.

During prolonged use of a catalyst carrier, a reduction of the specific surface area occurs, which is the result of the coalescence of the ultra-fine micropores. During this coalescence, a portion of the catalyst is incorporated into the carrier mass, and may no longer be kept in contact with the reagents.

Up until the present time, most of the ceric oxides that have been prepared give a specific surface area which decreases rapidly under operating temperatures above 500° C. Thus R. ALVERO and colleagues (Journal of the Chemical Society, Dalton Trans. 1984, 87) obtained, using ammonium cerinitrate, a ceric oxide which, after calcination at 600° C., gives a specific surface area of 29 $m^2/g$.

Furthermore, Patent No. FR-A 2 559 754 contains a description of a ceric oxide which gives a specific surface area of at least $85\pm5$ $m^2/g$, obtained following calcination at between 350 and 450° C. and which is, preferably, between 100 and 130 $m^2/g$ after calcination at between 400° and 450° C. Said oxide is prepared by means of hydrolysis of a watery ceric nitrate solution in a nitric acid medium; the precipate obtained is then separated out, washed with an organic solvent, dried if conditions require, then subjected to calcination. The ceric oxide obtained gives a significant specific surface area when prepared within a calcination temperature range extending from 300° to 600° C. However, a decrease of the specific surface area after calcination at a higher temperature is observable; the specific surface area is 10 $m^2/g$ after calcination at 800° C.

The Patent No. FR-A 2 559 755 may also be cited. This details a ceric oxide giving a specific surface area of at least $85\pm5$ $m^2/g$ after calcination at between 350° and 500° C., and is, preferably, between 150 and 180 $m^2/g$ after calcination at between 400° and 450° C. This oxide is obtained according to a process which involves precipitating a basic ceric sulfate, by reacting a watery ceric nitrate solution with a watery solution containing sulfate ions, separating out the precipitate thus obtained, washing it using a ammonia hydroxide solution, drying it if necessary, and then calcining it at a temperature varying between 300° and 500° C. The ceric oxide thus obtained gives a large specific surface area, but, when subjected to calcination at 800° C., its specific surface area decreases significantly and falls to about 10 $m^2/g$.

One of the objectives of the present invention is the specification of a process providing an increase in the specific surface area of a ceric oxide obtained by calcination of a ceric hydroxide.

Another objective is to make available a process which improves the stability of the specific surface area at high temperature.

In order to achieve the first objective, the present invention proposes a process for preparation of a ceric oxide obtained by calcination of a ceric hydroxide; this process is characterized by the fact that the cerium hydroxide is subjected to solvothermal treatment before calcination.

More specifically, the invention process consists of the following steps:

placement of the ceric hydroxide in suspension in a liquid medium;

heating of the ceric hydroxide in a sealed chamber until a temperature and pressure are achieved which are below the critical temperature and pressure, respectively, of said medium;

cooling of the reactive medium and its return to atmospheric pressure;

separating out of the ceric hydroxide thus treated;

calcination of the ceric hydroxide.

The applicant discovered that carrying out a thermal pretreatment, termed henceforth "autoclaving" of the ceric hydroxide, before calcination, enables the specific surface area of the ceric oxide obtained to be enlarged.

According to the following theoretical interpretation, which does not in any way limit the field of the invention, it is thought that the autoclaving of the ceric hydroxide allows recrystallization of the hydrate, which leads to an increase in the crystallization rate and, consequently, to a decrease of the non-crystalline part, thus avoiding the aggregation of the crystallites among themselves during calcination and permitting an increase in the specific surface area of the ceric oxide obtained.

It should be noted that calcination results in an increase in the dimensions of the crystallites, and that autoclaving permits limitation of that increase, thus leading to better stability of the specific surface area.

Ceric hydroxide thus plays a role in the invention process; it may be a hydrated ceric oxide $CeO_2,2H_2O$, or a ceric hydroxide that may contain residual quantities of bound or adsorbed anions.

Thus, the ceric hydroxide used in the invention process may correspond to the following formula:

$$Ce(OH)_{4-ay}(A)_y, nH_2O \qquad (I)$$

in which:

A symbolizes a residual anion;

a is a whole number representing the anion's charge;

y is a number between 0 and 2;

n is a number between 0 and about 20.

The ceric hydroxide which is, most preferably, used according to the invention, corresponds to formula (I), in which a is a whole number less than or equal to 3 and, preferably, equal to 1 or 2, and y is a number between 0 and 1.5.

As regards residual anions A, chlorides, sulfates, nitrates, acetates, formates, etc., may be specified, with preference given to nitrates or chlorides.

It should be observed that it is also possible to use in the invention procedure, a ceric hydroxide that may contain a phase of ceric oxide. Use may, therefore, be made of cerium compounds described in the European Patent Application No. 87 400 600.0, but these are not the compounds of choice, since they do not provide maximum benefit from the advantages of the present invention, which result from the pre-existence of the ceric oxide phase during autoclaving.

A ceric hydroxide corresponding to formula (I) is a primary material of choice, when prepared according to the process described below: in this process, a cerium salt solution is reacted with a base, possibly in the presence of an oxidizing agent, the precipitate obtained is separated out, and this is washed and/or dried, as required.

The cerium salt solution used may be any watery cerium salt solution in a cerous and/or ceric state, soluble under the conditions of preparation; preference is given to a cerous chloride or cerium nitrate solution in a cerous or ceric state, or a mixture of the two.

The cerium salt solution chosen must not contain impurities that may reappear in the calcined product. Benefit may be gained from the use of a cerium salt having a degree of purity in excess of 99%.

The concentration of the cerium salt solution is not a critical factor for the invention. It may vary within broad limits, but a concentration of between 0.2 and 4 moles per liter is preferred.

In a preferred variant, cerium in the cerous state is introduced into the reactive medium and is oxidized in a ceric state using an oxidizing agent.

The appropriate oxidizing agents include solutions of perchlorate, chlorate, hypochlorite, sodium persulfate, potassium or ammonium, hydrogen peroxide (oxygenated water) or air, oxygen, and ozone. Oxygenated water is preferred.

The proportion of oxidizing agent to the cerous salt to be oxidized may vary within broad limits. In general, it surpasses stoichiometry and preferably corresponds to an excess of between 10 and 40%.

Another preferred variant of the invention involves the use of a watery ceric nitrate solution, which normally has some degree of initial acidity and may have a normality of between 0.01N and 5N. The concentration of the $H^4$ ions is not critical, but a concentration of between 0.1N and 1N is desirable.

As for primary materials, use may be made of a ceric nitrate solution obtained by the action produced by nitric acid on a hydrated ceric oxide prepared conventionally; for example, by the action produced by nitric acid on cerous carbonate and the addition of a ammonia hydroxide solution in the presence of an oxidizing agent, preferably hydrogen peroxide.

One primary material of choice is a ceric nitrate solution obtained according to the electrolytic oxidation process applied to a cerous nitrate solution, as described in the French Patent Application No. FR-A 2 570 087.

Precipitation of the ceric hydroxide may be carried out by reacting a cerium salt solution with a basic solution.

The basic solution may, in particular, be a watery ammonia hydroxide, sodium hydroxide, or potassium solution. A ammonia hydroxide solution is preferred. The normality of the basic solution is not a critical factor within invention parameters; it may vary within broad limits, but will most advantageously range from 1 to 5N, and preferably between 2 and 3N.

The proportion of the basic solution to the cerium salt solution must be such that the number of basic equivalents is greater than or equal to the number of cerium equivalents. Benefit may be derived from using a basic equivalents excess greater than 5%. The pH of the reactive medium may be established between 6 and about 10, but is best established between 7.0 and 9.0. Optimal results will be obtained when the pH is adjusted within these limits at a constant value of +0.1 pH unit.

The temperature of the reactive medium should preferably be between 5° and 95° C., and, more specifically, between 40° and 70° C. The mixing time in the reactive medium is not a critical factor, and may vary within broad limits; however, the time-period generally chosen will be between 15 minutes and 2 hours.

A precipitate is obtained which may be separated out according to conventional solid-liquid separation techniques, such as decantation, spinning, filtration, and/or centrifuging.

According to a preferred embodiment of the invention, the precipitate separated out is washed, in order to remove the remaining ions adsorbed on the precipitate.

Washing is preferably done using water or a basic solution having a preferred concentration of between 1 and 5N. Preference is given to a ammonia hydroxide solution. One or several washings may be done, and, most often, there will be from 1 to three.

The ceric hydroxide which is separated out and washed, if required, may be used directly in the invention process. It is also possible to subject it to a drying procedure. Air-drying or drying under reduced pressure may be carried out; this latter may, for example, be done at a pressure on the order of from 1 to 100 mm of mercury (133.322 pa to 13332.2 pa). The drying temperature may vary between room temperature and 100° C., and the length of the drying period, while not critical, may range from 2 to 48 hours.

The ceric hydroxide obtained according to the procedure described above is a preferred element of the process specified by the invention.

In accordance with invention procedure, the ceric hydroxide is used in suspension form in a liquid medium.

The liquid medium used may be any liquid that does not react with the ceric hydroxide under the temperature and pressure parameters specified by the invention.

Among the liquids that may be used, water or a basic solution is preferred, especiallY an alkaline metal hydroxide solution, and, in particular, a sodium hydroxide solution or any solution of a base which is decomposable under the conditions for calcination specified by the invention.

"Decomposable base" signifies a compound having a $pk_b$ of less than 7 which may be decomposed under the conditions for calcination given in the invention.

Examples of decomposable bases include liquid ammonium, urea, ammonium acetate, ammonium hydrogenocarbonate, ammonium carbonate, or a primary, secondary, or tertiary amine, such as methylamine, ethylamine. propylamine, n-butylamine, sec-butylamine, n-pentylamine, 2-aminopentane, 2 amino, 2-methylbutane, 1-amino 3-methylbutane, 1,2-diaminoethane, 1,2-diaminopropane, 1,3-diaminopropane, 1,4-diaminobutane, 1,5-diaminopentane, 1,6-diamino-hexane, dimethylamine,. diethylamine, trimethylamine, triethylamine, or a quarternary amine such as tetraalkylammonium hydroxide having, preferably, alkyl radicals containing from 1 to 4 carbon atoms; use is made, most especially, of tetramethylammonium hydroxide or tetraehtylammonium hydroxide.

A mixture of bases may also be used.

A preferred embodiment of the invention utilizes a decomposable-base solution, since it has been found, unexpectedly, that carrying out the autoclaving procedure in such a medium not only permits an increase in the specific surface area of the ceric oxide obtained, but also allows a large specific surface area and a high porous volume to be maintained up to temperatures of 900° C.

Preference is given to use of a ammonia hydroxide or a tetraalkylammonium hydroxide solution, or mixtures of them.

When the liquid medium is a basic solution, its concentration is not a critical factor according to the invention. It may vary within broad limits, for example between 0.1 and 11N; however, it is preferable to use solutions whose concentrations vary between 1 and 10N.

In this liquid medium, the concentration of the ceric hydroxide, expressed in terms of $CeO_2$, may vary between 0.3 and 6 moles per liter, and, preferably, between 2 and 3 moles per liter.

Autoclaving is done at a temperature between the reflux temperature and the critical temperature of the reactive medium. Preferably, a temperature between 100° and 350° C. will be chosen; most preferably, the temperature will be between 150° and 350° C.

The raising of the temperature occurs at a rate that is not critical. The reactive temperature may be achieved, for example, by heating for from 30 minutes to 4 hours.

The invention process may be carried out by introducing ceric hydroxide in suspension into the liquid medium in a sealed chamber; pressure results only from the heating of the reactive medium.

In the temperature parameters given above, and in a watery medium, it may be specified, by way of illustration, that the pressure varies between 1 ($10^5$ Pa) and 165 bars (165.$10^5$ Pa), and preferably between 5 (5.$10^5$ Pa) and 165 bars (165.$10^5$ Pa). It is also possible to apply external pressure, which supplement the pressure resulting from heating.

The duration of the autoclaving is not critical, and may vary between 30 minutes and 6 hours.

Upon completion of autoclaving, cooling is performed until inertness of the system is achieved, and the system is brought back to atmospheric pressure.

The product in suspension in the liquid medium is separated out using conventional solid-liquid separation techniques, such as decantation, spinning, filtration, and/or centrifugation.

The product collected may be subjected to washing and/or drying under the conditions previously described.

In a last step of the invention process, the product obtained is calcined at a temperature of between 300° and 1,000° C., and, preferably, between 350° and 800° C.

The duration of calcination may vary, within broad limits, between 30 minutes and 10 hours, and, preferably, between 2 and 6 hours.

When the invention procedure is carried out according to the preferred parameters specified below, it produces an oxide having new morphological properties.

The characteristic property of the ceric oxide according to the invention is the obtention of a specific surface area of at least 15 $m^2/g$, measured after calcination at a temperature of between 800° and 900° C.

The preferred ceric oxide according to the invention gives a specific surface area of between 20 and 60 $m^2/g$, measured after calcination at a temperature of 800° C., Under the conditions for calcination of the ceric hydroxide, the ceric oxide gives a specific surface area of between 15 and 160 $m^2/g$, measured after calcination at a temperature varying between 350° and 900° C.

Figure 1:
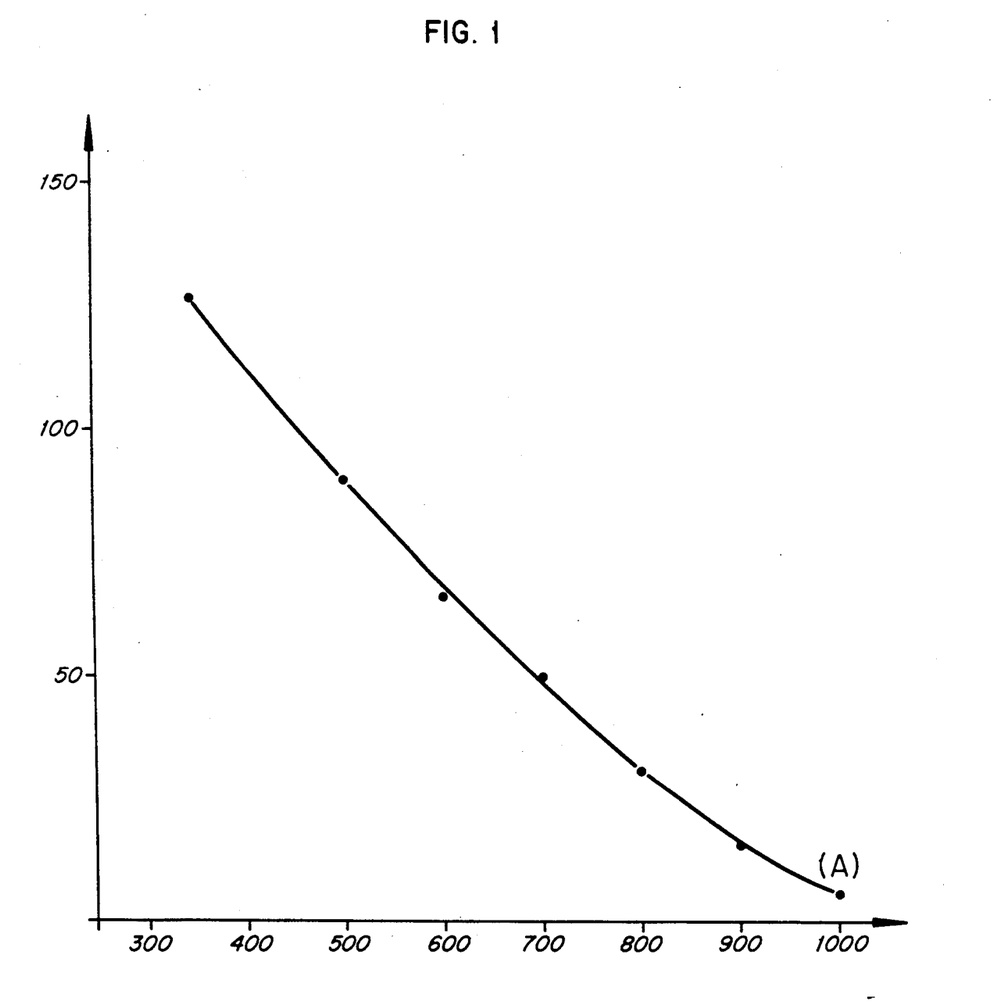

FIG. 1 shows a graph on which is traced the curve (A) of variation of the specific surface area (expressed in $m^2/g$) of a ceric oxide according to the invention, as a function of the calcination temperature, given in °C.

The ceric oxide according to the invention gives a specific surface area of at least 15 $m^2/g$, measured after calcination at a temperature of between 800° and 900° C., and a specific surface area greater than said surface, after calcination at a temperature below the range already cited.

Thus, it can give a specific surface area ranging between 70 and 160 $m^2/g$, and, preferably, between 100 and 160 $m^2/g$, measured after calcination between 350° and 450° C. However, when subjected to a higher temperature of up to 900° C., at the time of its use, particularly as a catalyst, it has the property of conserving a specific surface area of at least 15 m/g, and, preferably, of between 20 and 60 $m^2/g$ when subjected to a temperature of 800° C.

In the present application, the specific surface areas expressed are measured of a product which has undergone calcination for at least 2 hours.

Another property of the ceric oxide according to the invention is that it possesses a porous volume greater than 0.1 $cm^3/g$ at a measuring temperature of between 800° and 900° C., and, preferably, greater than 0.15 $cm^3/g$.

The porous volume corresponding to pores having a diameter of less than 60 nm (600 Å) is measured using a mercury porosimeter according to the ASTM D4284-83 standard, or by following the nitrogen-adsorption isotherm method, the above-mentioned B.E.T. method.

The porous volume, like the specific surface area, is a function of the calcination temperature: it may vary between 0.35 and 0.15 $cm^3/g$ for a calcination temperature ranging from 350° to 900° C.

The preferred cerium oxide according to the invention gives a porous volume of between 0.15 and 0.25 $cm^3/g$ after calcination at a temperature of 800° C.

The size of the pores of a calcined cerium oxide at 800° C. ranges between 3 nm (30 Å) and 60 nm (600 Å): the average diameter ($d_{50}$) of the pores varies between 20 nm (200 Å) and 30 nm (300 Å), preferably around 25 nm (250 Å).

The definition of the average diameter specifies that all pores of a diameter less than the average make up 50% of the total porous volume ($V_p$) of the pores having a diameter of less than 60 nm (600 Å).

A cerium oxide calcined at 350° C. gives pores with a diameter of from 2 nm (20 Å) to 100 nm (1000 Å): the average diameter varies between 10 nm (100 Å) and 20 nm (200 Å), and is, preferably, around 15 nm (150 Å).

X-ray diffraction analysis shows that the ceric oxide according to the invention exhibits a crystalline phase of the $CeO_2$ having a mesh parameter ranging from 0.542 nm (5.42 Å) to 0.544 nm (5.44 Å). As a guide, it should be specified that the size of the crystallites of a cerium oxide obtained after calcination at 350° C. ranges from 4 nm (40 Å) to 6 nm (60 Å) and, after calcination at 800° C., between 10 nm (100 Å) and 20 nm (200 Å).

The process for obtaining a ceric oxide giving a specific surface area of at least 15 m²/g for a measuring temperature of between 800° and 900° C., consists of the following steps:

preparing a ceric hydroxide by reacting a cerium salt solution and a base, possibly in the presence of an oxidizing agent; the proportion of the base is such that the pH of the reactive medium is greater than 7. The precipitate obtained is separated out, and washed, if required.

placing the ceric hydroxide in suspension in water or in a watery decomposable-base solution.

heating it in a sealed chamber until a temperature and pressure are achieved which are less than the critical temperature and pressure, respectively, of said medium.

cooling the reactive medium and bringing it back to atmospheric pressure.

separating out the ceric hydroxide thus treated; calcination of the ceric hydroxide.

The reagents used for the preparation of the ceric hydroxide are those mentioned previously.

As regards the preferred ceric hydroxides, a ceric hydroxide corresponding to formula (II) is used:

$$Ce(OH)_x(X)_y, nH_2O \qquad (II)$$

in which:

x represents a chloride or nitrate anion y is less than 0.5 n ranges from 0 to about 20.

The preferred compound corresponds to formula (II), in which y ranges between 0 and 0.1. Even more preferably, X represents a nitrate anion.

The preferred compound corresponding to formula (II) is prepared by reacting a cerous chloride or nitrate solution with a ammonia hydroxide solution, in the presence of hydrogen peroxide (oxygenated water), by separating out the precipitate obtained, and by subjecting it to at least one washing, preferably in later.

The proportion of the base added is such that the reactive pH is greater than 7, and, preferably, with a range of 7.5 to 9.0.

The temperature of the reactive medium is chosen between 5 and 70° C., preferably between 40° and 70° C.

The ceric hydroxide is then subjected to autoclaving performed according to the parameters given previously; the medium in which the ceric hydroxide is placed in suspension is a decomposable-base solution, preferably a ammonia hydroxide or a tetraalkylammonium hydroxide solution.

The successive separation, washing (if required), and calcination procedures are identical to those mentioned previously.

The ceric oxide according to the invention gives a large specific surface area at high temperature of such high quality, that it is perfectly appropriate for use in the area of catalysis, either as a catalyst or as a catalyst carrier.

It is particular well adapted for use as a catalyst carrier for treatment reactions of exhaust gases from internal-combustion engines.

The following Examples illustrate the invention without being limitative.

Examples 1 to 22 demonstrate the effect of the autoclaving of the ceric hydroxide on the specific surface area of the ceric hydroxide obtained by calcination of the ceric hydroxide treated according to invention specifications.

Assays A through H are given for the purpose of comparison. They do not involve autoclaving.

EXAMPLE 1

Assay A

1. Synthesis of the ceric hydroxide

A double-sheathed reaction vessel having a usable volume of 2 liters and equipped with a stirring device, a system for feeding reagents (metering pump), is filled, simultaneously and over the course of one hour at 20° C., with 922 cm³ of cerous nitrate solution containing 179 g/l of $CeO_2$ and 38 cm³ of a 200-volume hydrogen peroxide solution.

Using a a feeding device connected to a pH-regulating mechanism, 860 cm³ of a watery ammonia hydroxide 3N solution is added over the course of one hour, simultaneously, until the pH reaches 7.

Once the reagents have been added, the reactive medium is kept at 70° C. for one hour.

Next, the precipitate is separated out using the Büchner method.

The yield is 280 g of a ceric hydroxide exhibiting a $NO_3$/Ce molar ratio of 0.16.

X-ray diffraction analysis reveals that the ceric hydroxide possesses crystallites having an average diameter of 5.5 nm (55 Å).

2. Autoclaving of the ceric hydroxide

A high-form, 100 cm³ beaker is filled in succession with 30 cm³ of deionized water and 30 g of the previously-prepared ceric hydroxide.

After homogenizing the ceric hydroxide in its medium, the beaker is placed in an autoclave having a usable volume of about 0.5 l.

The beaker and its contents are heated to 200° C., or approximately 16 bars (16.10⁵ Pa), for four hours using an appropriate heating method.

Upon completion of this hydrothermal treatment, the precipitate is filtered out according to the Büchner method.

Using X-ray diffraction, it is determined that the moist product contains crystallites having an average diameter of 6.5 nm (65 Å).

The product is then subjected to calcination at 350° C. for two hours.

Then, using the methods specified in the description, the specific surface area of the ceric oxide obtained and its porous volume of less than 60 nm (600 Å), are determined.

An X-ray diffraction is also employed to determine the size of the crystallites perpendicular to directions 110 and 220.

The results obtained are given in Table I. As a comparison, results are also given for a ceric oxide prepared using direct calcination at 350° C. for two hours of the ceric hydroxide synthesized under 1 (Assay A).

TABLE I

| | Specific surface area m²/g | Porous volume cm³/g | Average diameter of the crystallites nm (Å) |
|---|---|---|---|
| Example 1 | 101 | 0.06 | 7.0 (70) |
| Assay A | 54 | 0.04 | 7.5 (75) |

It is found that the ceric oxide obtained after autoclaving and calcination at 350° C. yields a specific surface area two times larger, as well as a lower crystallite size.

EXAMPLE 2

Assay B

1. Synthesis of ceric hydroxide

In an apparatus similar to that described in Example 1, 922 cm³ of a cerous nitrate solution containing 179 g/l of $CeO_2$ and 38 cm³ of a 200 volume hydrogen peroxide (oxygenated water) solution are added at 50° C.

860 cm³ of a watery ammonia hydroxide 4.6N solution are added until a pH equal to 9.0 is obtained.

Once the reagents have been added, the reactive medium is maintained at 70° C., for one hour.

Next, the precipitate is separated out using the Büchner method.

515 g of ceric hydroxide are obtained, having a $NO^3/Ce$ molar ratio of 0.1.

X-ray diffraction analysis reveals that the ceric hydroxide contains crystallites having an average diameter of 3 nm (30 Å).

2. Autoclaving of ceric hydroxide

Using the operating procedures in Example 1, 30 g of the ceric hydroxide prepared above and placed in suspension in 30 cm³ of deionized water are treated in an autoclave at 200° C. for 4 hours.

Using X-ray diffraction, the average diameter of the crystallites in the moist product is found to be 4.5 nm (45 Å).

Upon completion of this hydrothermal treatment, the precipitate is filtered according to Büchner.

It is then subjected to calcination at 350° C. for 2 hours.

Next, the specific surface area, the porous volume, and the size of the crystallites are determined on the ceric oxide which has undergone autoclaving (Example 2), and, for the purpose of comparison, on the ceric oxide prepared using direct calcination at 350° C. for 2 hours of the ceric hydroxide synthesized at 1 (Assay B).

The results obtained are recorded in Table II.

TABLE II

| | Specific surface area m²/g | Porous volume cm³/g | Average diameter of the crystallites nm (Å) |
|---|---|---|---|
| Example 2 | 100 | 0.26 | 5.0 (50) |
| Assay B | 70 | 0.20 | 6.5 (65) |

As in Example 1, the favorable effect of autoclaving on the specific area and on the porous volume of the ceric oxide obtained after calcination at 350° C. may be observed.

EXAMPLE 3

Assay C

1. Synthesis of ceric hydroxide

In an apparatus similar to that of example 1, 922 cm³ of a cerous nitrate solution containing 179 g/l of $CeO_2$ and 38 cm³ of a 200 volume hydrogen peroxide (oxygenated water) are added at 50° C.

825 cm³ of a watery ammonia hydroxide 4N solution are added until a pH of 8.4 is obtained.

Once the reagents have been added, the reactive medium is kept at 70° C. for one hour.

The precipitate is then separated out according to Büchner.

569 g of a ceric hydroxide having a $NO_3/Ce$ molar ratio of 0.1 are obtained.

X-ray diffraction analysis reveals that the ceric hydroxide contains crystallites having a diameter of 3.0 nm (30 Å).

2. Autoclaving of ceric hydroxide

Using the operating procedures described in Example 1, 30 g of the ceric hydroxide as prepared above, placed in suspension in 30 cm³ of deionized water, are subjected to autoclaving at 200° C. for 4 hours.

Using X-ray diffraction, the average diameter of the crystallites in the moist product are determined to be 4.5 nm (45 Å).

Upon completion of this hydrothermal treatment, the precipitate is filtered according to Büchner.

The precipitate then undergoes calcination at 350° C. for 2 hours.

The specific surface area, the porous volume, and the size of the crystallites are then determined on the ceric oxide that has undergone autoclaving (Example 3), and, for comparison purposes, on the ceric oxide prepared using direct calcination at 350° C., for two hours, of the ceric hydroxide synthesized at 1 (Assay C).

The results obtained are recorded in Table III.

TABLE III

| | Specific surface area m²/g | Porous volume cm³/g | Average diameter of the crystallites nm (Å) |
|---|---|---|---|
| Example 3 | 110 | 0.20 | 5.0 (50) |
| Assay C | 46 | 0.16 | 6.5 (65) |

It should be noted that the ceric oxide calcined at 350° C. gives a specific surface area and a porous volume that are higher, and crystallite dimensions that are lower.

EXAMPLE 4

Assay D

1. Synthesis of ceric hydroxide

Using an apparatus as described in Example 1, 922 cm³ of a cerous nitrate solution containing 179 g/l of $CeO_2$ and 38 cm³ of a 200 volume hydrogen peroxide (oxygenated water) solution are added at 50° C.

825 cm³ of a watery ammonia hydroxide 4N solution are added until a pH equal to 8.4 is obtained.

Once the reagents have been added, the reactive medium is kept at 70° C. for one hour.

The precipitate is then separated out according to Büchner.

X-ray diffraction analysis reveals that the ceric hydroxide contains crystallites having an average diameter of 3.0 nm (30 Å).

2. Autoclaving of ceric hydroxide

Using the operating procedures described in Example 1, 30 g of ceric hydroxide prepared as above, placed in suspension in 30 cm³ of deionized water, undergo autoclaving at 200° C. for 4 hours.

Using X-ray diffraction, the average diameter of the crystallites contained in the moist product is determined to be 4.5 nm (45 Å).

Upon completion of this hydrothermal treatment, the precipitate is filtered according to BÜchner.

The precipitate then undergoes calcination at 800° C. for 2 hours.

The specific surface area, the porous volume, and the size of the crystallites are determined on the ceric oxide that has undergone autoclaving (Example 4), and, for comparison purposes, on the ceric oxide prepared using direct calcination at 800° C. for 2 hours of the ceric hydroxide synthesized under 1 (Assay D).

The results are recorded in Table IV.

TABLE IV

| | Specific surface area m²/g | Porous volume cm³/g | Average diameter of the crystallites nm (Å) |
|---|---|---|---|
| Example 4 | 21 | 0.08 | — |
| Assay D | 11 | 0.06 | 30 (300) |

In comparison with Example 3, the ceric Oxide undergoes calcination at a higher temperature. A reduction in surface area and in porous volume are observed, which are due to substantial sintering, leading to the pronounced growth of crystallites between 350° and 800° C.

EXAMPLE 5

Assay C

1. Synthesis of ceric hydroxide

This is carried out in accordance with the operational procedures of Example 3-1.

2. Autoclaving of ceric hydroxide

Using the operating procedures described in Example 1, 30 g of ceric hydroxide prepared as above, placed in suspension in 30 cm³ of a watery ammonia hydroxide 1N solution, undergo autoclaving at 200° C. for 4 hours.

Using X-ray diffraction, the average diameter of the crystallites contained in the moist product is determined to be 4.0 nm (40 Å).

Upon completion of this hydrothermal treatment, the precipitate is filtered according to BÜchner.

The precipitate then undergoes calcination at 350° C. for 2 hours.

The specific surface area, the porous volume, and the size of the crystallites are determined on the ceric oxide that has undergone autoclaving (Example 5), and, for comparison purposes, on the ceric oxide prepared using direct calcination at 350° C. for 2 hours of the ceric hydroxide synthesized under 1 (Assay C).

The results are recorded in Table V.

TABLE V

| | Specific surface area m²/g | Porous volume cm³/g | Average diameter of the crystallites nm (Å) |
|---|---|---|---|
| Example 5 | 127 | 0.35 | 4.5 (45) |
| Assay C | 46 | 0.16 | 6.5 (65) |

As in the preceding examples, the favorable effect of autoclaving on the specific surface area and the porous volume of the ceric oxide obtained after calcination at 800° C. is observed.

EXAMPLE 6

Assay D

1 Synthesis of ceric hydroxide

This is carried out in accordance with the operating procedures of Example 4-1.

2. Autoclaving of ceric hydroxide

Using the operating procedures described in Example 1, 30 g of ceric hydroxide prepared as above, placed in suspension in 30 cm³ cf a watery ammonia hydroxide 1N solution, undergo autoclaving at 200° C. for 4 hours.

Using X-ray diffraction, the average diameter of the crystallites contained in the moist product is determined to be 4.0 nm (40 Å).

Upon completion of this hydrothermal treatment, the precipitate is filtered according to BÜchner.

The precipitate then undergoes calcination at 800° C. for 2 hours.

The specific surface area, the porous volume, and the size of the crystallites are determined on the ceric oxide that has undergone autoclaving (Example 6), and, for comparison purposes, on the ceric oxide prepared using direct calcination at 800° C. for 2 hours of the ceric hydroxide synthesized under 1 (Assay D).

The results ar recorded in Table VI.

TABLE VI

| | Specific surface area m²/g | Porous volume cm³/g | Average diameter of the crystallites nm (Å) |
|---|---|---|---|
| Example 6 | 30 | 0.19 | 19 (190) |
| Assay D | 11 | 0.06 | 30 (300) |

It is observed that autoclaving of the ceric hydroxide in an ammonia hydroxide medium permits limitation of the sintering of the crystallites during calcination, since the size of the crystallites cf the ceric oxide obtained after calcination at 800° C. is not greater than 20 nm (200 Å).

EXAMPLES 7 and 8

1. Synthesis of the ceric hydroxide

This is carried out in accordance with the operating procedures of example 3-1.

2. Autoclaving of ceric hydroxide

In a high-form 100 cm³ beaker, 25 cm³ of a 20% watery tetraehtylammonium hydroxide solution and 15 g of the previously-prepared ceric oxide are added successively.

After homogenization of the medium, the beaker is placed in an autoclave.

The beaker and contents are heated to 200° C., or about 16 bars (16.10⁵ Pa.), for 3 hours using an appropriate heating mechanism.

Upon completion of this thermal treatment, the precipitate is filtered according to BÜchner.

The precipitate then undergoes calcination under the following conditions: 2 hours at 350° C. in Example 7 and 1 hour at 800° C. in Example 8.

The specific surface area and the porous volume of the ceric oxides obtained are then determined.

The results are collected in Table VII.

TABLE VII

| | Specific surface area m²/g | Porous volume cm³/g |
|---|---|---|
| Example 7 | 115 | 0.53 |

TABLE VII-continued

|  | Specific surface area m²/g | Porous volume cm³/g |
|---|---|---|
| Example 8 | 29 | 0.23 |

EXAMPLES 9 to 20

Assays E and F

1. Synthesis of ceric hydroxide

In an apparatus similar to that described in Example 1, 922 cm³ of a cerous nitrate solution containing 150 g/l of $CeO_2$ and 38 cm³ of 200 volume hydrogen peroxide (oxygenated water) are added at room temperature.

Maintaining a temperature of 8° C., 150 cm³ of a watery ammonia hydroxide 3N solution are added until a pH equal to 9.5 is obtained.

Once the reagents have been added, the reactive medium is kept at 8° C. for one hour.

The precipitate is then separated out according to BÜchner, and is washed with water.

X-ray diffraction analysis reveals that the ceric hydroxide contains crystallites having an average diameter of 3.5 nm (35 Å).

2. Autoclaving of ceric hydroxide

A series of assays is performed, in which the autoclaving temperature is made to vary between 160° and 330° C.

Using the same operating procedures in the preceding Examples, 150 g of the ceric hydroxide as prepared above in suspension is placed in 150 cm³ of a watery ammonia hydroxide 1N solution, and this mixture undergoes autoclaving for 4 hours.

Upon completion of this thermal treatment, the precipitate is filtered according to BÜchner.

The precipitate then undergoes calcination under the following conditions: 2 hours at 350° C. in Examples 9 through 14, and 2 hours at 800° C. in Examples 15 through 20.

The specific surface area and the porous volume of the ceric oxides obtained are then determined.

For the purpose of comparison, record is made of the results obtained with a ceric oxide prepared by means of direct calcination at 350° C. (Assay E) and at 800° C. (Assay F) for two hours, of the ceric hydroxide synthesized under 1.

All of these results are recorded in Table VIII.

TABLE VIII

|  | Autoclaving temperature | Calcination temperature | Specific surface area - m²/g | Porous volume cm³/g |
|---|---|---|---|---|
| Example 9 | 160° C. | 350° C. | 69 |  |
| Example 10 | 180° C. | 350° C. | 85 |  |
| Example 11 | 200° C. | 350° C. | 131 | 0.24 |
| Example 12 | 250° C. | 350° C. | 126 | 0.27 |
| Example 13 | 300° C. | 350° C. | 81 | 0.20 |
| Example 14 | 330° C. | 350° C. | 73 | 0.25 |
| Assay E |  | 350° C. | 65 | 0.12 |
| Example 15 | 160° C. | 800° C. | 20 |  |
| Example 16 | 180° C. | 800° C. | 20 |  |
| Example 17 | 200° C. | 600° C. | 26 | 0.15 |
| Example 18 | 250° C. | 800° C. | 27 | 0.14 |
| Example 19 | 300° C. | 800° C. | 31 | 0.12 |
| Example 20 | 330° C. | 800° C. | 45 | 0.17 |
| Assay F |  | 800° C. | 9.7 | 0.07 |

Example 21

Assay G

1. Synthesis of ceric hydroxide

In a double-sheathed reacting vessel, in which water, thermoregulated at 20° C., circulates, which has a usable capacity of 2,000 cm³, and which is equipped with a stirring device and a reagent-feeding system, the following solutions are added simultaneously and continuously:

a watery ceric nitrate solution containing 1 mole/liter of cerium IV and 0.06 mole/liter of cerium IV; this solution, which has a free acidity of 0.5N and is prepared by electrolysis according to FR-A 2 570 087 (No. 84 13641), is added at the rate of 0.92 liter/hour.

a watery ammonia hydroxide 3N solution, at the rate of of 1.08 liter/hour.

Mixing is accomplished by stirring at 300 revolutions/minute; the staying time is 60 minutes.

The discharge of the starting solutions into the vessel is controlled for the purpose of maintaining a pH of 5.5.

The precipitate is separated out using filtration according to BÜchner.

The resulting product contains 42% of $CeO_2$, and the crystallite size is less than 3 nm (30 Å).

2. Autoclaving of ceric hydroxide

In an autoclave having a usable capacity of 0.5 l, 300 cm³ of $NH_4OH$ 1N and 100 g of previously-prepared ceric hydroxide are added successively.

After homogenization of the ceric hydroxide in its medium, the mixture is heated to 200° C., or about 16 bars (16.10⁵ Pa), for 3 hours using an appropriate heating method.

Upon completion of this hydrothermal treatment, the precipitate is filtered according to BÜchner.

The precipitate then undergoes calcination under the following conditions: 3 hours at 350° C. and 1 hour at 800° C.

Then, using the procedures specified in the description, the specific surface area and the porous volume of the ceric oxide are determined.

Results are given in Table IX. For comparison purposes, results are also recorded for a ceric oxide prepared using direct calcination at 350° C. for 2 hours and at 800° C. for 1 hour, of the ceric hydroxide synthesized under 1.

TABLE IX

|  | Calcination temperature °C. | Specific surface area m²/g | Porous volume cm³/g |
|---|---|---|---|
| Example 21 | 350 | 135 | 0.21 |
|  | 800 | 7 | 0.08 |
| Assay G | 350 | 46 | 0.09 |
|  | 800 | 3.5 | 0.04 |

EXAMPLE 22

Assay H

1. Synthesis of ceric hydroxide

In a double-sheathed reacting vessel, in which water, thermoregulated at 20° C., circulates, which has a usable capacity of 2,000 cm³, and which is equipped with a stirring device and a reagent-feeding system, the following solutions are added simultaneously and continuously:

a watery ceric nitrate solution containing 1 mole/liter of cerium IV and 0.06 mole/liter of cerium III; this solution, which has a free acidity of 0.5 N and is prepared by electrolysis according to FR-A 2 570 087 (No. 84 13641), is added at the rate of 0.78 liter/hour.

a watery ammonia hydroxide 3N solution, at the rate of of 1.22 liter/hour.

Mixing is accomplished by stirring at 300 revolutions per minute; the staying time is 60 minutes.

The discharge of the starting solutions into the vessel is controlled for the purpose of maintaining a pH of 9.0.

The precipitate is separated out using filtration according to BÜchner.

The resulting product contains 20% by weight of ceric oxide, and the crystallite size is less than 3 nm (30 Å).

2. Autoclaving of ceric hydroxide

In an autoclave having a usable capacity of 0.5 l, 300 cm$^3$ of NH$_4$OH 1N and 100 g of previously-prepared ceric hydroxide are added successively.

After homogenization of the ceric hydroxide in its medium, the mixture is heated to 200° C., or about 16 bars (16.10$^5$ Pa), for 3 hours using an appropriate heating method.

Upon completion of this hydrothermal treatment, the precipitate is filtered according to BÜchner.

The precipitate then undergoes calcination under the following conditions: 2 hours at 350° C. and 1 hour at 800° C.

Then, using the procedures specified in the description, the specific surface area and the porous volume of the ceric oxide are determined.

Results are given in Table X. For comparison purposes, results are also recorded for a ceric oxide prepared using direct calcination at 350° C. for 2 hours and at 800° C. for 1 hour, of the ceric hydroxide synthesized under 1.

TABLE X

|  | Calcination temperature °C. | Specific surface area m$^2$/g | Porous volume cm$^3$/g |
|---|---|---|---|
| Example 22 | 350 | 155 | 0.24 |
|  | 800 | 17 | 0.06 |
| Assay H | 350 | 53 | 0.05 |
|  | 800 | 4.9 | 0.03 |

One may observe the favorable effect of autoclaving on the specific surface area and on the porous volume of the ceric oxide obtained following calcination at 800° C.

What is claimed is:

1. A process for preparing a ceric oxide obtained by calcination of a ceric hydroxide, wherein the ceric hydroxide is subjected to solvothermal treatment before calcination, said solvothermal treatment including the steps of:
   forming a suspension of the ceric hyrdroxide in a liquid medium;
   heating the suspension in a sealed chamber until a temperature and pressure are achieved which are less than the critical temperature and pressure, respectively, of said liquid medium;
   cooling the liquid medium and reducing the pressure to atmospheric; and
   separating the ceric hydroxide thus reacted from the liquid medium.

2. Process according to claim 1, wherein the ceric hydroxide placed in suspension corresponds to the following formula:

(I)

in which:
   A symbolizes a residual anion;
   a is a whole number representing the charge of the anion;
   y is a number between 0 and 2;
   n is a number between 0 and about 20.

3. Process according to claim 2, wherein the ceric hydroxide corresponds to formula (I), in which a is less than or equal to 3.

4. Process according to claim 2 or 3, wherein the ceric hydroxide corresponds to formula (I), in which a is equal to 1 or 2.

5. Process according to claim 3, wherein the ceric hydroxide corresponds to formula (I), in which y is a number between 0 and 1.5.

6. Process according to claim 2, wherein the residual anion is a chloride, sulfate, nitrate, acetate, or formate.

7. Process according to claim 6, wherein the residual anion is a chloride or nitrate.

8. Process according to claim 2, wherein the ceric hydroxide is prepared by reacting a cerium salt solution and a base, in certain conditions in a reaction medium, optionally in the presence of an oxidizing agent, and by separating out the precipitate obtained.

9. Process according to claim 8, wherein the cerium salt solution is a cerous chloride or cerium nitrate solution in a cerous or ceric state, or a mixture thereof.

10. Process according to claim 9, wherein the cerium salt solution is a watery ceric nitrate or a watery cerous nitrate solution used in the presence of an oxidizing agent.

11. Process according to claim 10, wherein the cerium salt solution is a watery ceric nitrate derived from the electrochemical oxidation of a cerous nitrate solution, or from the reaction of nitric acid on a hydrated ceric oxide.

12. Process according to claim 8, wherein the base is an ammonia hydroxide solution.

13. Process according to claim 8, wherein the oxidizing agent is hydrogen peroxide.

14. Process according to claim 8, wherein the quantity of the base to be added is such, that the pH of the reactive medium ranges between 6 and approximately 10.

15. Process according to claim 14, wherein the pH ranges between 7.0 and 9.0.

16. Process according claim 8, wherein the temperature of the reactive medium is between 5° and 95° C.

17. Process according to claim 16, wherein the temperature of the reactive medium is between 40° and 70° C.

18. Process according to claim 8, wherein the ceric hydroxide separated out is washed with water or with a basic solution.

19. Process according to claim 1, wherein the liquid medium is water or a basic solution.

20. Process according to claim 19, wherein the basic solution is an alkaline metal hydroxide solution or a decomposable-base solution under calcination conditions.

21. Process according to claim 20, wherein the decomposable base is ammonia hydroxide, urea, ammonium hydrogenocarbonate, ammonium carbonate, or a primary, secondary, tertiary, or quarternary amine, or mixtures of them.

22. Process according to claim 21, wherein the decomposable base is ammonia hydroxide, a tetraalkylammonium hydroxide, or mixtures of these.

23. Process according to claim 19 wherein the concentration of the basic solution ranges between 1 and 10N.

24. Process according to claim 1 wherein prior to the solvothermal treatment the concentration of the ceric hydroxide expressed in terms of $CeO_2$ varies between 0.3 and 6 moles/liter.

25. Process according to claim 24, wherein said concentration is between 2 and 3 moles/liter.

26. Process according to claim 1, wherein the autoclaving temperature ranges between 100° and 350° C.

27. Process according to claim 26, wherein said temperature is between 150° and 350° C.

28. Process according to claim 1, wherein the pressure varies between 1 ($10^5$ Pa) and 165 bars ($165.10^5$ Pa).

29. Process according to claim 28, wherein said pressure ranges from between 5 ($5 \times 10^5$ Pa) to 165 bars ($165 \times 10^5$ Pa).

30. Process according to claim 26, wherein the duration of the autoclaving procedure varies from between 30 minutes to 6 hours.

31. Process according to claim 1, wherein the calcination temperature varies from between 300° to 1,000° C.

32. Process according to claim 31, wherein said temperature ranges from between 350° and 800° C.

33. Process according to claim 31 or 32, wherein the duration of calcination ranges from between 2 and 6 hours.

34. Process according to claim 8, wherein the separated precipitate is subjected to at least one of washing or drying.

* * * * *